(12) United States Patent
Sehara (10) Patent No.: US 8,000,199 B2
(45) Date of Patent: Aug. 16, 2011

(54) OPTICAL DISK APPARATUS

(75) Inventor: Syunsuke Sehara, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 12/793,102

(22) Filed: Jun. 3, 2010

(65) Prior Publication Data

US 2010/0315911 A1 Dec. 16, 2010

(30) Foreign Application Priority Data

Jun. 12, 2009 (JP) .................. 2009-140634

(51) Int. Cl.
G11B 7/00 (2006.01)
(52) U.S. Cl. .................. 369/53.34; 369/44.13
(58) Field of Classification Search ........... 369/44.13, 369/53.34
See application file for complete search history.

(56) References Cited

U.S. PATENT DOCUMENTS

| 2004/0196754 A1* | 10/2004 | Mashimo | 369/44.13 |
| 2005/0025009 A1* | 2/2005 | Ono | 369/47.25 |
| 2006/0002254 A1 | 1/2006 | Ishihara et al. | |
| 2006/0044961 A1* | 3/2006 | Jin | 369/44.13 |

FOREIGN PATENT DOCUMENTS

| EP | 1 662 492 A1 | 5/2006 |
| JP | 2002-251742 A | 9/2002 |
| JP | 2005-116148 A | 4/2005 |

OTHER PUBLICATIONS

European Search Report dated Oct. 22, 2010 (ten (10) pages).

* cited by examiner

Primary Examiner — Latanya Bibbins
(74) Attorney, Agent, or Firm — Crowell & Moring LLP (57) ABSTRACT

An optical disk apparatus to record data on an optical disk on which a wobble is formed, the optical disk apparatus including; a detection unit including a BPF which a signal obtained from a reflected light from an optical disk passes, the detection unit to detect a wobble signal from a wobble based on the signal passing the BPF; and a register to store an adjustment value for adjusting the BPF as a register value, so as to adjust the BPF based on each of register values obtained by changing the register value 1 LSB by 1 LSB; acquire an amplitude of the signal passing the BPF, the amplitude corresponding to each of the register values; identify one of the register values for the largest acquired amplitude; and adjust the BPF based on a value obtained by adding 1 LSB to the identified register value when data is recorded.

2 Claims, 6 Drawing Sheets

OPTICAL DISK APPARATUS

BACKGROUND OF THE INVENTION

1. Field of the Invention

The present invention relates to an optical disk apparatus.

2. Description of the Related Art

There are optical disks such as a compact disk-read only memory (CD-ROM) and a digital versatile disk-read only memory (DVD-ROM), which are for playback only; a compact disk-recordable (CD-R), a digital versatile disk-recordable (DVD-R), and a digital versatile disk+recordable (DVD+R), which are recordable; and a compact disk-rewritable (CD-RW), a digital versatile disk-rewritable (DVD-RW), a digital versatile disk+rewritable (DVD+RW), and a Blu-ray disc (BD), which are rewritable.

The recordable optical disks such as a CD-R and a DVD-R and the rewritable optical disks such as a CD-RW and a DVD-RW are different from the playback-only optical disks such as a CD-ROM and a DVD-ROM in that a groove track and a land track are pre-formed on a recording surface of the recordable optical disks and the rewritable optical disks, but not of the playback-only optical disks. A groove track is wobbled in a predetermined cycle, so that wobbles are formed at both margins thereof in the predetermined cycle, respectively. A wobble signal is detected from a wobble so as to be used for controlling rotation of an optical disk and generating a recording clock. Hence, when a wobble signal is of high quality, data can be recorded at high quality without reducing its video quality and audio quality.

Conventionally, a band-pass filter which a wobble signal detection circuit to detect a wobble signal has is adjusted such that the amplitude of a signal which passes through the band-pass filter becomes largest.

More specifically, there is known an optical disk apparatus in which the amplitude of a signal which passes through a band-pass filter is measured, and the band-pass filter is adjusted such that the amplitude thereof becomes largest. (For example, refer to Japanese Patent Application Laid-open Publication No. 2005-116148 (hereinafter Patent Document 1).)

Patent Document 1 also describes an optical disk apparatus in which the jitter of a signal which passes through a band-pass filter is measured, and the band-pass filter is adjusted such that the jitter thereof becomes smallest.

In order to detect a highest-quality wobble signal, it is preferable that, like the optical disk apparatus of Patent Document 1, the jitter of the signal be directly measured, and the band-pass filter be adjusted such that the jitter thereof becomes smallest.

However, adding an element such as a jitter measurement circuit to an optical disk apparatus is required to measure jitters. As a result, a problem arises that a manufacturing cost and the like of an optical disk apparatus increases.

SUMMARY OF THE INVENTION

Therefore, a main object of the present invention is to provide an optical disk apparatus to record data at higher quality without increasing a manufacturing cost thereof and reducing its video quality and audio quality.

According to a first aspect of the present invention, there is provided an optical disk apparatus to record data on an optical disk on which a wobble is formed, the optical disk apparatus including; a detection unit including a band-pass filter through which a signal obtained from a reflected light from an optical disk passes, the detection unit to detect a wobble signal from a wobble based on the signal which passes through the band-pass filter; a register to store an adjustment value for adjusting the band-pass filter as a register value; an acquisition unit to adjust the band-pass filter based on each of register values obtained by changing the register value 1 LSB by 1 LSB, and acquire an amplitude of the signal which passes through the band-pass filter, the amplitude corresponding to each of the obtained register values; an identification unit to identify one of the register values for the amplitude acquired by the acquisition unit to be largest; and an adjustment unit to adjust the band-pass filter based on a value obtained by adding 1 LSB to the register value identified by the identification unit when data is recorded.

According to a second aspect of the present invention, there is provided an optical disk apparatus to record data on and reproduce data from an optical disk on which a wobble is formed, the optical disk apparatus including; a detection unit including a band-pass filter through which a signal obtained from a reflected light from an optical disk passes, the detection unit to detect a wobble signal from a wobble based on the signal which passes through the band-pass filter; a register to store an adjustment value for adjusting the band-pass filter as a register value; an acquisition unit to adjust the band-pass filter based on each of register values obtained by changing the register value 1 LSB by 1 LSB, and acquire an amplitude of the signal which passes through the band-pass filter, the amplitude corresponding to each of the obtained register values; an identification unit to identify one of the register values for the amplitude acquired by the acquisition unit to be largest; and an adjustment unit to adjust the band-pass filter based on the register value identified by the identification unit when data is reproduced, and adjust the band-pass filter based on a value obtained by adding 1 LSB to the register value identified by the identification unit when data is recorded.

BRIEF DESCRIPTION OF THE DRAWINGS

The above and other objects, advantageous and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment according to the present invention is described in details referring to the drawings. The drawings are given by way of illustration only, and thus are not intended to limit the scope of the present invention.

The embodiment is described taking a DVD 141 as an example of an optical disk and a DVD recorder 1 as an example of an optical disk apparatus.

The DVD recorder 1 is an apparatus to record data on and reproduce data from the DVD 141 on which wobbles are formed.

More specifically, the DVD 141 is a DVD-R, which is recordable, and a groove track and a land track are pre-formed on a recording surface thereof. The groove track is wobbled in a predetermined cycle, so that wobbles are formed at both margins of the groove track in the predetermined cycle, respectively. The DVD recorder 1 controls a timing for recording data and a timing for reproducing data by detecting a wobble signal from the wobble. Land pre-pits are formed on the land track. The DVD recorder 1 identifies a position in the DVD 141 by detecting a land pre-pit signal from the land pre-pit.

Figure 1:
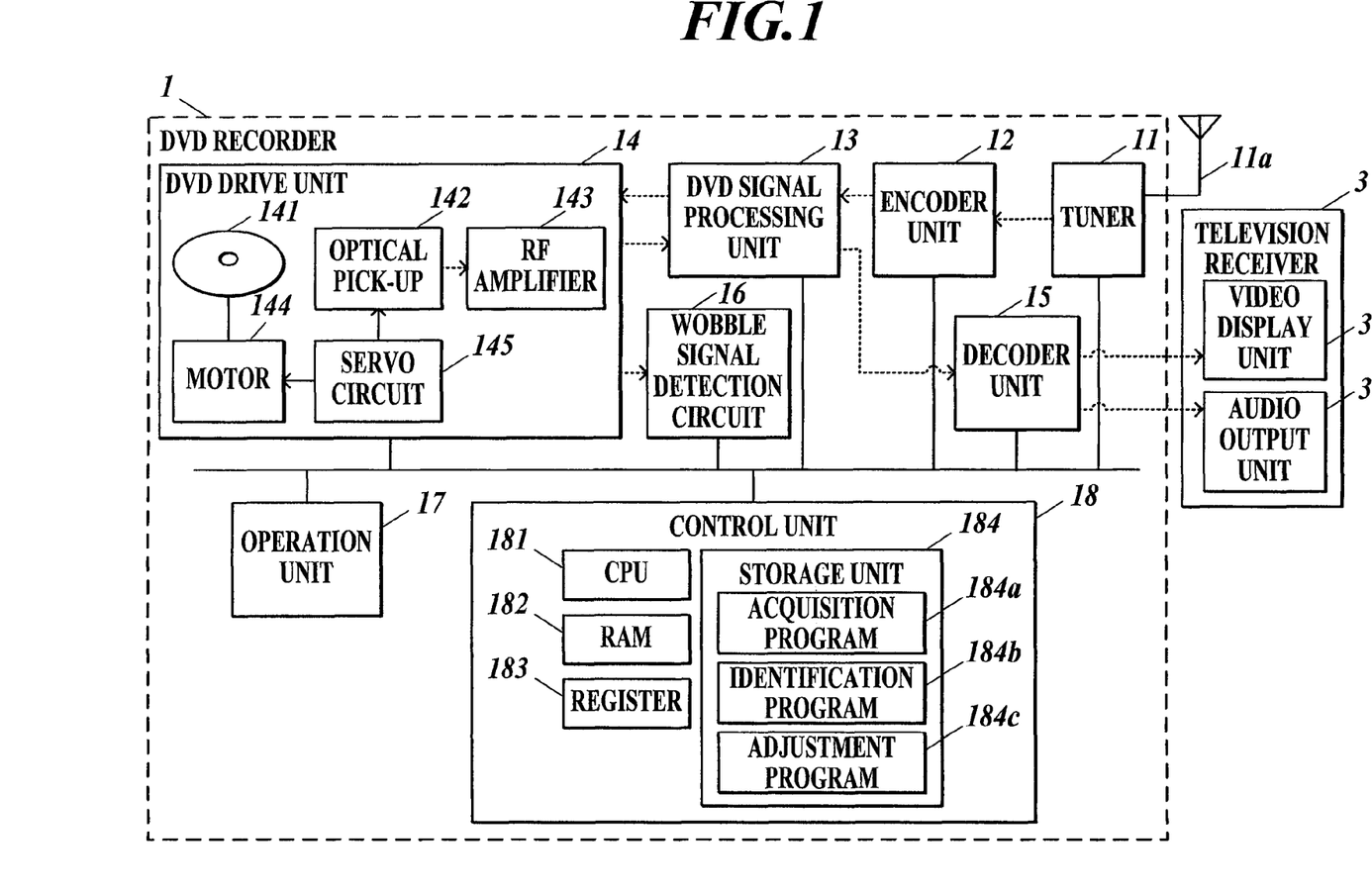
FIG. 1 is a block diagram showing a functional structure of a DVD recorder according to an embodiment of the present invention.

As shown in FIG. 1, the DVD recorder 1 includes a tuner 11 connected to an antenna 11a, an encoder unit 12, a DVD signal processing unit 13, a DVD drive unit 14, a decoder unit 15, a wobble signal detection circuit 16, an operation unit 17, and a control unit 18. The DVD recorder 1 is connected to a television receiver 3.

The tuner 11 receives a television broadcasting signal (for example, a digital terrestrial broadcasting signal, a BS digital broadcasting signal, or a CS broadcasting signal) of a television broadcasting wave, for example, in response to a control signal inputted from the control unit 18.

More specifically, the antenna 11a is structured so as to receive at least one of a digital terrestrial broadcasting wave, a BS digital broadcasting wave, and a CS broadcasting wave, for example. The tuner 11 receives a television broadcasting signal which exists in a frequency range specific to a channel for a desired program of the television broadcasting wave received by the antenna 11a, and converts the received signal into a signal with a low frequency. Then, prescribed processing is performed on the television broadcasting signal so as to convert the signal into a transport stream (TS), and a necessary TS packet is extracted therefrom and outputted to the encoder unit 12 and the like.

The encoder unit 12 includes a video encoder, an audio encoder, a data encoder, and a formatter.

The video encoder compresses inputted video data by a prescribed compression method so as to packet the video data, and send the video data to the formatter as a video packet.

The audio encoder compresses inputted audio data by a prescribed compression method so as to packet the audio data, and send the audio data to the formatter as an audio packet.

The formatter performs multiplexing processing on the video data inputted from the video encoder, the audio data inputted from the audio encoder, and the like, converts the data on which the multiplexing processing is performed into a file format in which the data can be written on the DVD 141 at the DVD drive unit 14, and then supplies the data to the DVD signal processing unit 13.

When the data is input from the encoder unit 12, the DVD signal processing unit 13 performs prescribed processing such as error correction coding and demodulating on the data, temporarily stores the data in a buffer memory of the DVD signal processing unit 13, and then outputs the data to the DVD drive unit 14 and the like at a timing when a control signal is input from the control unit 18. Consequently, writing processing is performed at the DVD drive unit 14.

When reading processing is performed at the DVD drive unit 14, and data (radio frequency signal) is input from the DVD drive unit 14, the DVD signal processing unit 13 performs prescribed processing such as error correction coding and demodulating on the data, temporarily stores the data in the buffer memory of the DVD signal processing unit 13, and then outputs the data to the decoder unit 15 and the like at a timing when a control signal is input from the control unit 18.

The DVD drive unit 14 includes the DVD 141 which is removable from and attachable to the DVD drive unit 14, an optical pick-up 142, a radio frequency (RF) amplifier 143, a motor 144, and a servo circuit 145. The DVD drive unit 14 performs the writing processing to write data on the DVD 141, the reading processing to read data recorded on the DVD 141, and the like, in response to a control signal inputted from the control unit 18, for example.

The optical pick-up 142 includes an object lens (not shown), a laser diode (not shown), a photo-detector 142a, and a laser drive unit (not shown).

The optical pick-up 142 generates a laser beam by condensing a laser light by using the object lens, the laser light which is radiated from the laser diode, for example, in response to a control signal inputted from the control unit 18, and irradiates the DVD 141 with the leaser beam. Then, the photo-detector 142a detects a reflected light of the laser beam with which the DVD 141 is irradiated.

The laser drive unit drives the laser diode, for example, in response to a control signal inputted from the control unit 18, and irradiates the DVD 141 with a prescribed leaser beam required for reading data so as to read data recorded on the DVD 141. The laser drive unit also drives the laser diode, for example, in response to a control signal inputted from the control unit 18, and irradiates the DVD 141 with a prescribed laser beam required for writing data so as to write data on the DVD 141.

The photo-detector 142a converts the reflected light from the DVD 141 into an electric signal (reflected light detection signal), and outputs the reflected light detection signal to the wobble signal detection circuit 16 and the like via the RF amplifier 143 and the like (or directly).

Figure 2:
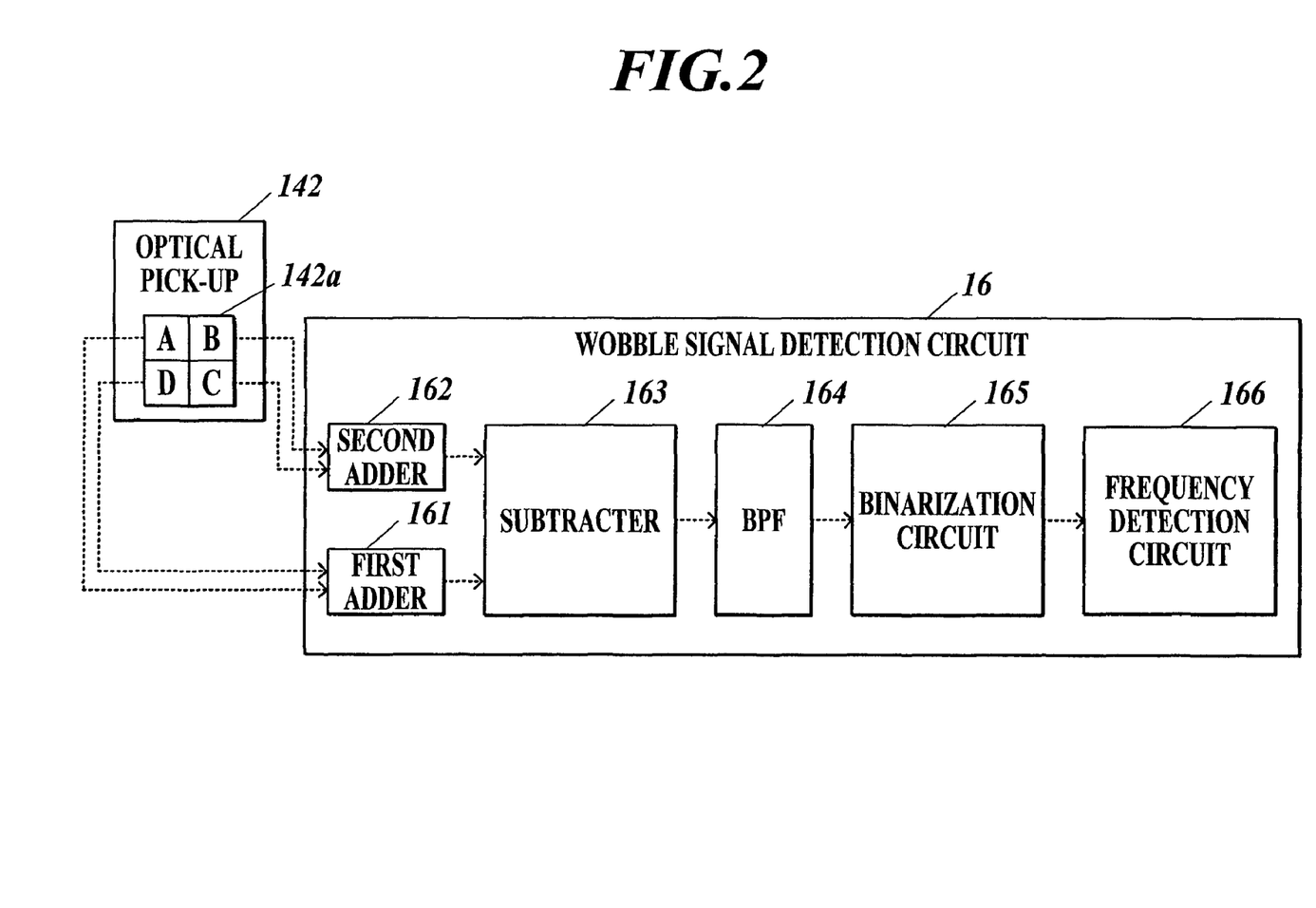
FIG. 2 is a block diagram showing a functional structure of a wobble signal detection circuit of FIG. 1.

More specifically, the photo-detector 142a is, for example, a four-divided detector having a first section A, a second section B, a third section C, and a forth section D as shown in FIG. 2.

The RF amplifier 143 generates an RF signal, a tracking signal, a focus signal, and the like from the reflected light detection signal inputted from the optical pick-up 142, and outputs the generated signal to the DVD signal processing unit 13, the control unit 18, and the like.

The motor 144 includes a spindle motor (not shown) to turn a prescribed turntable for placing the DVD 141.

The motor 144 is controlled by the servo circuit 145 so as to rotate the DVD 141 such that the linear velocity thereof becomes uniform, for example.

The servo circuit 145 controls driving of the motor 144, for example, in response to a control signal inputted from the control unit 18 so as to rotate the motor 144 at a prescribed rotational speed.

The servo circuit 145 also controls driving of a sled motor (not shown), for example, in response to a control signal inputted from the control unit 18 so as to move the optical pick-up 142 in a radial direction of the DVD 141 as needed.

The decoder unit 15 includes a division unit (Demultiplexer), a video decoder, an audio decoder, and a data decoder.

The division unit divides the data (data stream) inputted from the DVD drive unit 14 via the DVD signal processing unit 13 into a plurality of streams such as a video stream and an audio stream.

The video decoder performs prescribed processing such as decoding on the video stream inputted from the division unit. Then, the video stream on which the prescribed processing is performed is output to a video display unit 31 of the television receiver 3 which is connected to the DVD recorder 1.

The audio decoder performs prescribed processing such as decoding on the audio stream inputted from the division unit. Then, the audio stream on which the prescribed processing is performed is output to an audio output unit 32 of the television receiver 3 which is connected to the DVD recorder 1.

The video display unit 31 included in the television receiver 3 is, for example, a liquid crystal display (LCD), and displays video based on the video data (video stream) outputted from the decoder unit 15.

The audio output unit 32 included in the television receiver 3 is, for example, a speaker, and outputs audio based on the audio data (audio stream) outputted from the decoder unit 15.

The wobble signal detection circuit 16 includes a bandpass filter (BPF) 164 through which a signal obtained from the reflected light from the DVD 141 passes, and as a detection unit, detects (extracts) a wobble signal from a wobble based on the signal which passes through the BPF 164.

More specifically, the wobble signal detection circuit 16 includes a first adder 161, a second adder 162, a subtracter 163, the BPF 164, a binarization circuit 165, and a frequency detection circuit 166 as shown in FIG. 2.

The first adder 161 is connected to the first section A and the fourth section D included in the photo-detector 142*a* of the optical pick-up 142. The first adder 161 adds a signal from the fourth section D to a signal from the first section A, and outputs the added signal (A+D) to the subtracter 163.

The second adder 162 is connected to the second section B and the third section C included in the photo-detector 142*a* of the optical pick-up 142. The second adder 162 adds a signal from the third section C to a signal from the second section B, and outputs the added signal (B+C) to the subtracter 163.

The subtracter 163 generates a push-pull signal ((A+D)−(B+C)) from the signal (A+D) inputted from the first adder 161 and the signal (B+C) inputted from the second adder 162, and outputs the push-pull signal to the BPF 164.

The BPF 164 removes a noise component and the like except a wobble frequency component from the push-pull signal inputted from the subtracter 163, and outputs the push-pull signal from which the noise component and the like are removed to the binarization circuit 165, the control unit 18, and the like.

Characteristics (intermediate frequency and the like) of the BPF 164 are adjusted by the control unit 18.

The binarization circuit 165 generates a binary signal from the signal which passes through the BPF 164, and outputs the binary signal to the frequency detection circuit 166.

The frequency detection circuit 166 detects the wobble frequency component (wobble signal) from the binary signal inputted from the binarization circuit 165, and outputs the wobble signal to the control unit 18 and the like.

The operation unit 17 includes various operation buttons provided on an external surface of a case of the DVD recorder 1 and the like, and outputs an operation signal in response to user's button operation of the operation buttons to the control unit 18 and the like. The operation unit 17 may include another operation device such as a remote controller to remotely control the DVD recorder 1.

The control unit 18 includes a central processing unit (CPU) 181, a random access memory (RAM) 182, a register 183, and a storage unit 184 as shown in FIG. 1, and performs centralized control of these units and the like of the DVD recorder 1.

The CPU 181 performs various control actions, for example, in accordance with various processing programs for the DVD recorder 1, the programs stored in the storage unit 184.

The RAM 182 includes a program storage area to expand the processing programs and the like executed by the CPU 181, and a data storage area to store inputted data, results of processing obtained when the processing programs are executed, and the like.

The register 183 stores, for example, an adjustment value for adjusting the BPF 164 included in the wobble signal detection circuit 16 as a register value.

The storage unit 184 stores a system program which can be executed by the DVD recorder 1, various processing programs which can be executed by the system program, data used when the processing programs are executed, data of the results of processing, the data on which arithmetic processing is performed by the CPU 181, and the like.

The programs are stored in the storage unit 184 in a form of a program code which can be read by a computer.

The storage unit 184 stores an acquisition program 184*a*, an identification program 184*b*, and an adjustment program 184*c* as shown in FIG. 1, for example.

The acquisition program 184*a* allows the CPU 181 to activate a function to adjust the BPF 164 based on each of register values stored in the register 183, the register values obtained by changing the register value 1 LSB (least significant bit) by 1 LSB, and acquire the amplitude of a signal which passes through the BPF 164, the amplitude corresponding to each of the register values.

More specifically, an initial value is pre-stored in the register 183 as the adjustment value for adjusting the characteristics of the BPF 164.

First, the CPU 181 adjusts the BPF 164 based on the register value (initial value) stored in the register 183, acquires the amplitude of a signal which passes through the adjusted BPF 164, correlates the acquired amplitude with the initial value, and stores the acquired amplitude correlated with the initial value in the RAM 182 and the like.

Next, the CPU 181 repeats a processing step of acquiring the amplitude of the signal which passes through the BPF 164 and storing the acquired amplitude in the RAM 182 and the like for a preset number of times (for example, N times) while the register value stored in the register 183 is increased (or decreased) by 1 LSB each time the processing step is repeated. More specifically, the CPU 181 stores a register value obtained by adding 1 LSB (or −1 LSB) to the initial value in the register 183, adjusts the BPF 164 based on the obtained register value (first register value) stored in the register 183, acquires the amplitude of the signal which passes through the adjusted BPF 164, correlates the acquired amplitude with the first register value, and stores the acquired amplitude correlated with the first register value in the RAM 182 and the like. Thereafter, the CPU 181 stores a register value obtained by adding 2 LSB (or −2 LSB) to the initial value in the register 183, adjusts the BPF 164 based on the obtained register value (second register value) stored in the register 183, acquires the amplitude of the signal which passes through the adjusted BPF 164, correlates the acquired amplitude with the second register value, and stores the acquired amplitude correlated with the second register value in the RAM 182 and the like. The CPU 181 repeats a series of these processing steps until an acquired amplitude correlated with a N-th register value is stored in the RAM 182 and the like.

The CPU 181 functions as an acquisition unit by executing the acquisition program 184a.

The identification program 184b allows the CPU 181 to activate a function to identify a register value for the largest amplitude acquired by the CPU 181 executing the acquisition program 184a.

More specifically, the CPU 181 identifies a register value for the amplitude of the signal to be largest, the signal which passes through the BPF 164, from a result of the acquired amplitudes stored in the RAM 182 and the like, and then the CPU 181 stores the identified register value in the register 183.

Figure 3:
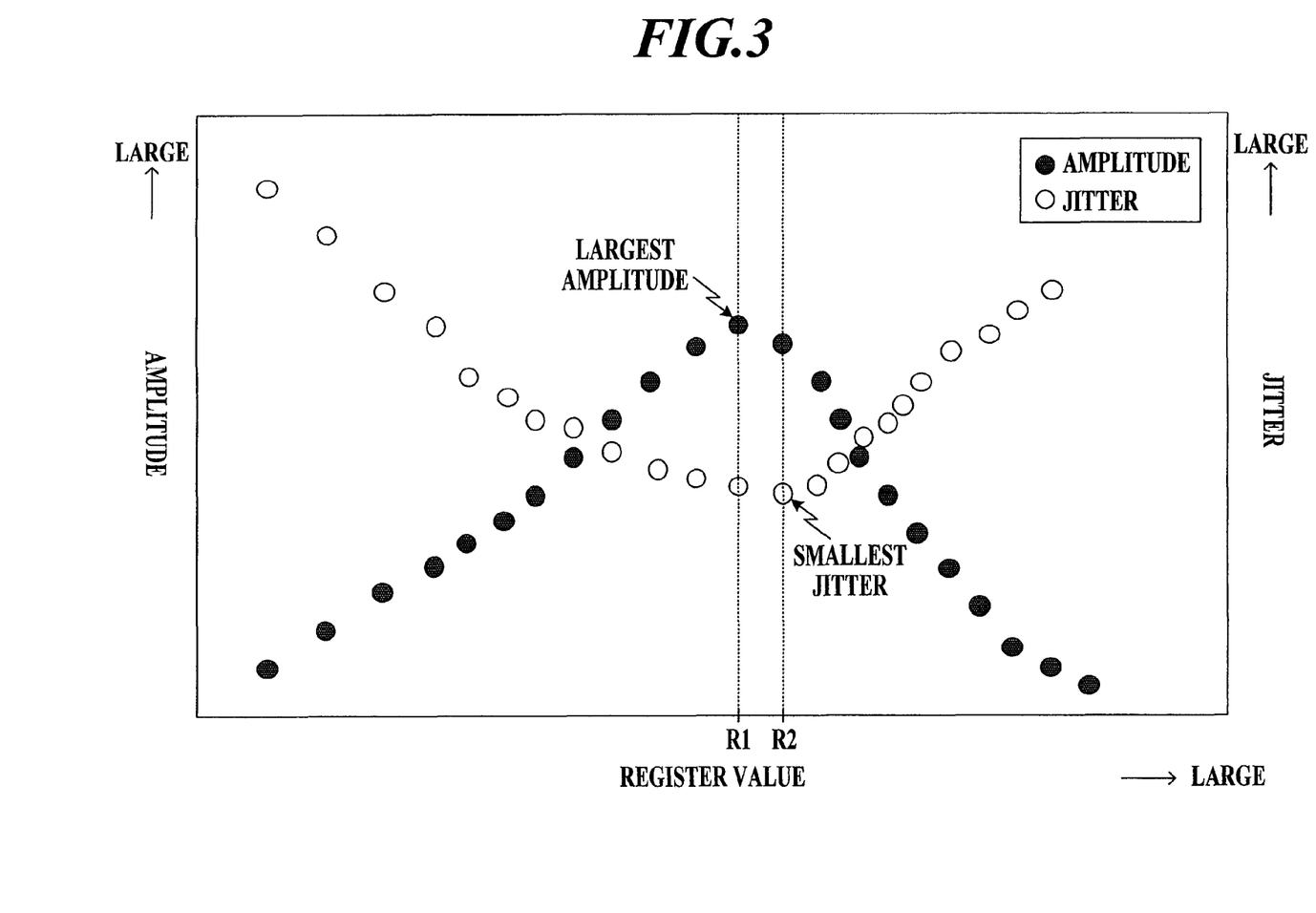
FIG. 3 shows a relationship between a register value for the amplitude of a signal to be largest, the signal passing through a band-pass filter (BPF), and a register value for the jitter of a wobble signal to be smallest, the wobble signal detected by the wobble signal detection circuit.

An example of the relationship between the amplitude of the signal which passes through the BPF 164 and the register value is shown in FIG. 3 by being plotted with black circles (●). Namely, the amplitude increases as the register value increases until the register value exceeds a prescribed register value (R1 in FIG. 3), and the amplitude decreases as the register value increases once the register value exceeds the prescribed register value (R1). Consequently, the prescribed register value (R1) is identified as the register value for the amplitude of the signal to be largest, the signal which passes through the BPF 164.

The CPU 181 functions as an identification unit by executing the identification program 184b.

The adjustment program 184c allows the CPU to activate a function to adjust the BPF 164 when data is reproduced or recorded, based on a value obtained by adding 1 LSB to the register value identified by the CPU 181 executing the identification program 184b.

The quality of a wobble signal can be evaluated by the jitter (the amount of time variation of a signal) of the wobble signal. Namely, the smaller the jitter of a wobble signal is, the higher the quality of the wobble signal is.

An example of the relationship between the jitter of the wobble signal detected by the wobble signal detection circuit 16 and the register value is shown in FIG. 3 by being plotted with white circles (○). Namely, the jitter decreases as the register value increases until the register value exceeds a prescribed register value (R2 in FIG. 3), and the jitter increases as the register value increases once the register value exceeds the prescribed register value (R2). Consequently, the prescribed register value (R2) is identified as a register value for the jitter of the wobble signal to be smallest, the wobble signal detected by the wobble signal detection circuit 16, namely, as a register value for detecting a highest-quality wobble signal by the wobble signal detection circuit 16.

The white circles shown in FIG. 3 can be obtained by connecting a prescribed jitter measurement circuit to the DVD recorder 1, and measuring the jitter of the wobble signal, which is detected by the wobble signal detection circuit 16, by using the jitter measurement circuit.

More specifically, the BPF 164 is adjusted based on a register value (initial value) stored in the register 183, the jitter of the wobble signal detected by the wobble signal detection circuit 16 which includes the BPF 164 is measured by the jitter measurement circuit, and the measured jitter is correlated and stored with the initial value. Then, a processing step of measuring and storing the jitter of the wobble signal detected by the wobble signal detection circuit 16 including the BPF 164 is repeated while the register value stored in the register 183 is increased (or decreased) by 1 LSB each time the processing step is repeated. Consequently, the white circles shown in FIG. 3 can be obtained.

As shown in FIG. 3, the register value for the amplitude of the signal to be largest, the signal which passes through the BPF 164, is different from the register value for the jitter of the wobble signal to be smallest, the wobble signal which is detected by the wobble signal detection circuit 16. In the DVD 141 (DVD-R), the register value (R1) for the amplitude of the signal to be largest plus 1 LSB equals the register value (R2) for the jitter of the wobble signal to be smallest.

On the other hand, in a conventional DVD recorder, a wobble signal is detected by adjusting a BPF based on a register value for the amplitude of the signal to be largest, the signal which passes through the BPF. It is understood from FIG. 3 that such a detected wobble signal is not of the highest quality.

In order to detect a highest-quality wobble signal, it is preferable to identify a register value for the smallest jitter by directly measuring jitters of wobble signals. However, in a conventional DVD recorder, adding a jitter measurement circuit or the like to the DVD recorder is required to measure jitters, and accordingly a manufacturing cost and the like of the DVD recorder increases.

In view of the circumstances, in the DVD recorder 1 according to the embodiment of the present invention, a relationship between the register value for the amplitude of the signal to be largest, the signal which passes through the BPF 164, and the register value for the jitter of the wobble signal to be smallest, the wobble signal which is detected by the wobble signal detection circuit 16, is obtained in advance, for example, as shown in FIG. 3. Consequently, the DVD recorder 1 according to the embodiment of the present invention is structured so as to detect a highest-quality wobble signal by adjusting the BPF 164 based on a value which is obtained by adding an offset to the register value for the amplitude of the signal to be largest, the signal which passes through the BPF 164.

The CPU 184 functions as an adjustment unit by executing the adjustment program 184c.

<Register Value Identification Processing>

Figure 4:
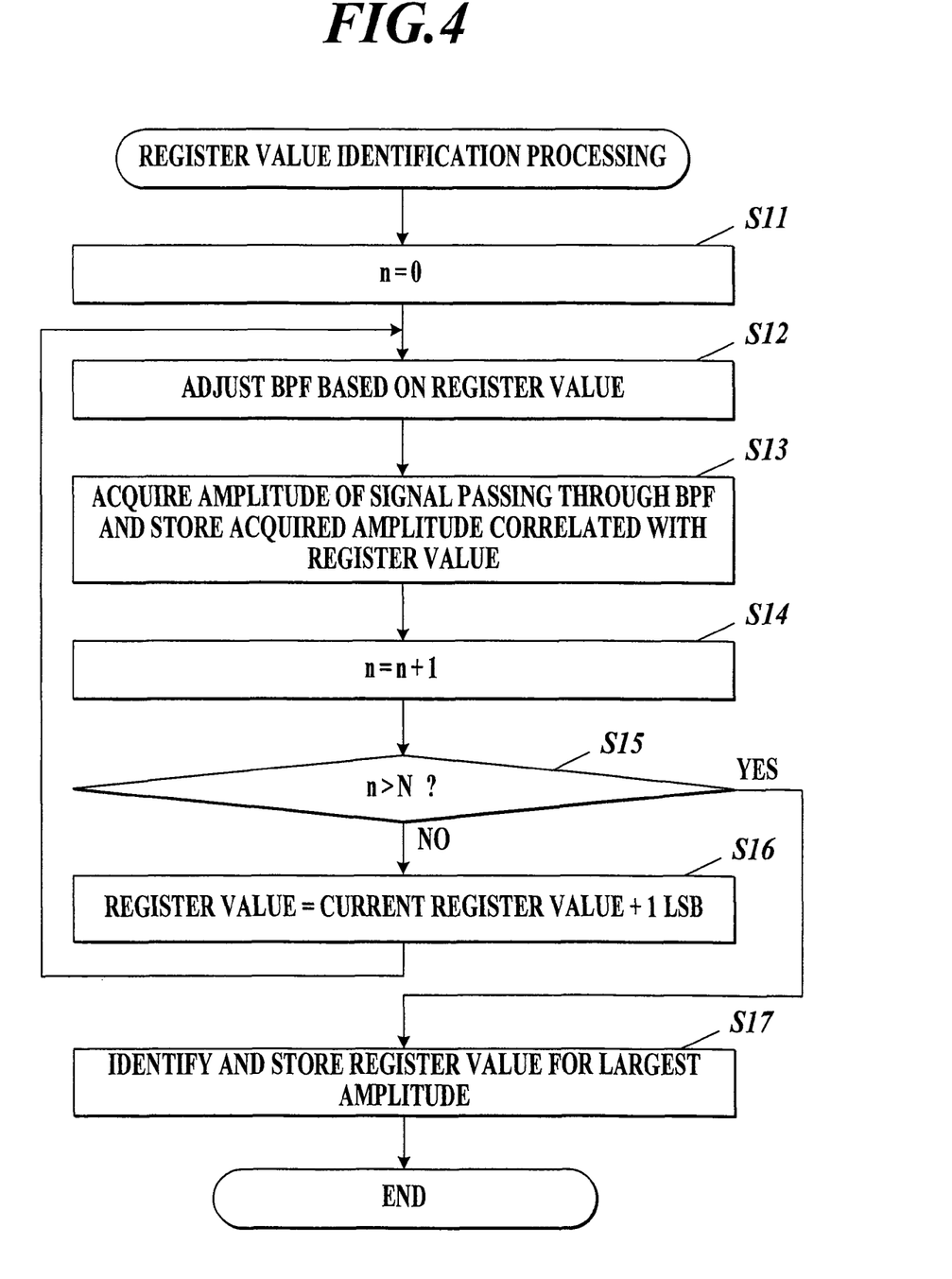
FIG. 4 is a flow chart of register value identification processing to identify the register value for the amplitude of a signal being largest, the signal passing through the BPF, according to the embodiment of the present invention.

Next, register value identification processing to identify the register value for the amplitude of the signal to be largest, the signal which passes through the BPF 164, is described referring to a flow chart of FIG. 4.

First, the CPU 181 sets "0" to an "n" storage area in the RAM 182 (Step S11).

Next, the CPU 181 executes the acquisition program 184a, and adjusts the BPF 164 based on a register value stored in the register 183 (Step S12), and acquires the amplitude of the signal which passes through the BPF 164, correlates the acquired amplitude with the register value, and stores the acquired amplitude correlated with the register value in the RAM 182 and the like (Step S13).

When "0" is set to the "n" storage area in the RAM 182, the BPF 164 is adjusted based on the initial value which is pre-stored in the register 183.

Thereafter, the CPU 181 sets "n+1" to the "n" storage area in the RAM 182 (Step S14), and determines whether or not a value set to the "n" storage area in the RAM 182 is larger than a preset value "N" (Step S15).

When it is determined that the value set to the "n" storage area in the RAM 182 is not larger than the preset value "N" (Step S15; NO), the CPU 181 sets a register value obtained by adding 1 LSB to the current register value in the register 183 (Step S16), and repeats Step S12 and the steps thereafter.

When it is determined that the value set to the "n" storage area in the RAM 182 is larger than the preset value "N" (Step S 15; YES), the CPU 181 executes the identification program 184b, identifies a register value for the amplitude of the signal to be largest, the signal which passes through the BPF 164, from a result of the acquired amplitudes stored in the RAM 182 and the like, and stores the identified register value in the register 183 (Step S17), and then ends the register value identification processing.

<BPF Adjustment Processing>

Figure 5:
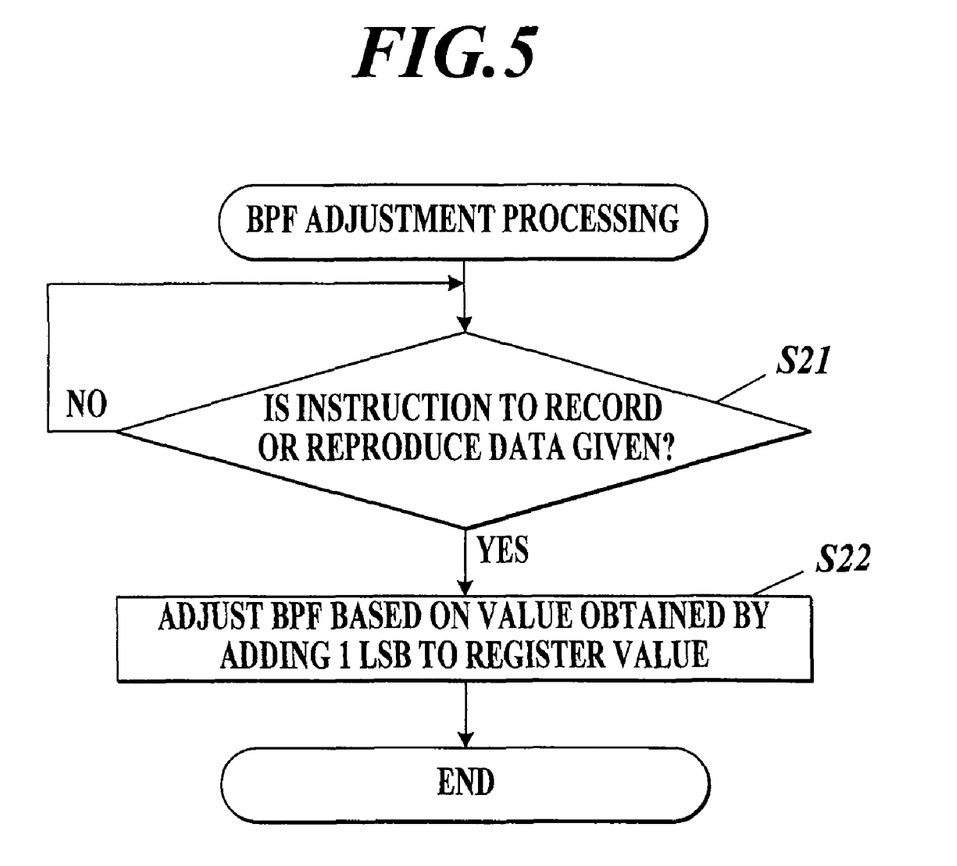
FIG. 5 is a flow chart of BPF adjustment processing to adjust the BPF, the BPF adjustment processing being performed when data is recorded and reproduced, according to the embodiment of the present invention.

Next, BPF adjustment processing to adjust the BPF 164, the BPF adjustment processing being performed when data is recorded and reproduced, is described referring to a flow chart of FIG. 5.

First, the CPU 181 determines whether or not an instruction to record data on or reproduce data from the DVD 141 is given by user operation on the operation unit 17 or the like (Step S21).

When it is determined that the instruction to record data on or reproduce data from the DVD 141 is not given (Step S21; NO), the CPU 181 repeats Step S21.

When it is determined that the instruction to record data on or reproduce data from the DVD 141 is given (Step S21; YES), the CPU 181 executes the adjustment program 184c, and adjusts the BPF 164 based on a value obtained by adding 1 LSB to the register value (stored in the register 183 at Step S17) in the register 183 (Step S22), and then ends the BPF adjustment processing.

Consequently, the DVD recorder 1 can record data on the DVD 141 or reproduce data from the DVD 141 while detecting a highest-quality wobble signal.

As described above, the DVD recorder 1 according to the embodiment of the present invention includes: the wobble signal detection circuit 16 including the BPF 164 through which a signal obtained from a reflected light from the DVD 141 passes, the wobble signal detection circuit 16 to detect a wobble signal from a wobble based on the signal which passes through the BPF 164; and the register 183 to store an adjustment value for adjusting the BPF 164 as a register value. According to the DVD recorder 1, the BPF 164 is adjusted based on each of register values stored in the register 183, the register values obtained by changing the register value 1 LSB by 1 LSB so that an amplitude of the signal which passes through the BPF 164 can be acquired, the amplitude corresponding to each of the obtained register values; one of the register values for the largest acquired amplitude can be identified; and the BPF 164 can be adjusted based on a value obtained by adding 1 LSB to the identified register value when data is recorded.

Namely, a highest-quality wobble signal can be detected (extracted) without adding another element such as a jitter measurement circuit. Consequently, data can be recorded at higher quality without increasing a manufacturing cost and reducing its video quality and audio quality.

The present invention is not limited to the above embodiment, and can be appropriately modified without departing from the scope of the invention.

Modification

In the embodiment, when data is recorded or reproduced, the CPU 181 executing the adjustment program 184c adjusts the BPF 164 based on the value obtained by adding 1 LSB to the register value identified by the CPU 181 executing the identification program 184b. However, this is not a limit. For example, the BPF 164 may be adjusted based on the register value identified by the CPU 181 executing the identification program 184b when data is reproduced, and also be adjusted based on the value obtained by adding 1 LSB to the register value identified by the CPU 181 executing the identification program 184b when data is recorded.

Figure 6:
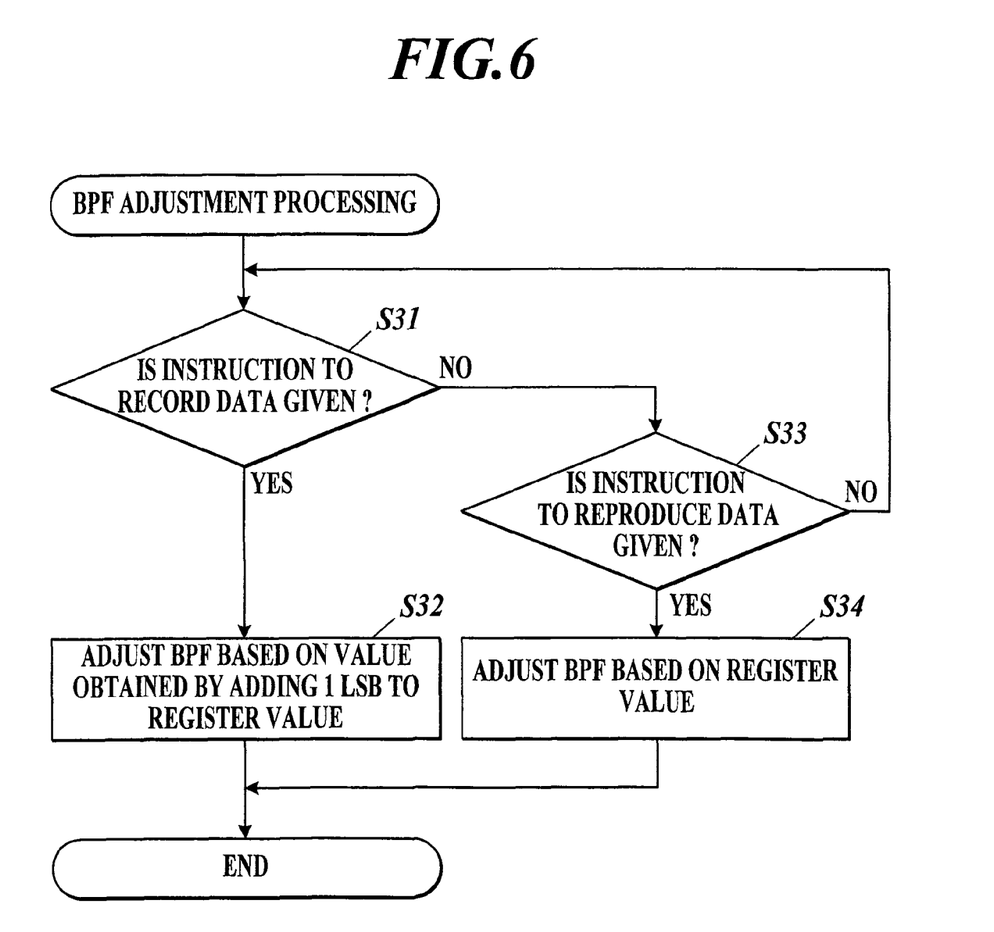
FIG. 6 is a flow chart of BPF adjustment processing to adjust the BPF, the BPF adjustment processing being performed when data is recorded and reproduced, according to a modification of the embodiment.

An example of the BPF adjustment processing to adjust the BPF 164 for this case, the BPF adjustment processing being performed when data is recorded and reproduced, is shown by a flow chart of FIG. 6.

More specifically, first, the CPU 181 determines whether or not an instruction to record data on the DVD 141 is given by user operation on the operation unit 17 or the like (Step S31).

When it is determined that the instruction to record data on the DVD 141 is given (Step S31; YES), the CPU 181 executes the adjustment program 184c, and adjusts the BPF 164 based on the value obtained by adding 1 LSB to the register value (stored in the register 183 at Step S17) in the register 183 (Step S32), and then ends the BPF adjustment processing.

When it is determined that the instruction to record data on the DVD 141 is not given (Step S31; NO), the CPU 181 determines whether or not an instruction to reproduce data from the DVD 141 is given by user operation on the operation unit 17 or the like (Step S33).

When it is determined that the instruction to reproduce data from the DVD 141 is not given (Step S33; NO), the CPU 181 repeats Step S31 and the steps thereafter.

When it is determined that the instruction to reproduce data from the DVD 141 is given (Step S33; YES), the CPU 181 executes the adjustment program 184c, and adjusts the BPF 164 based on the register value (stored in the register 183 at Step S17) in the register 183 (Step S34), and then ends the BPF adjustment processing.

According to the modification, data can be reproduced at higher quality since a signal having the largest amplitude is output from the BPF 164 when the data is reproduced.

In the embodiment and the modification, the DVD 141 as the optical disk is a DVD-R, but not limited thereto. As long as wobble are formed on the optical disk so that data can be recorded, the type of optical disk is optional. For example, the DVD 141 may be a DVD+R, a DVD-RW, a DVD+RW, a BD, or the like.

In addition, the optical disk apparatus of the present invention is not limited to the DVD recorder 1. The optical disk apparatus thereof can be appropriately changed depending on the type of optical disk.

In the embodiment and the modification, the processing step of acquiring the amplitude of the signal which passes through the BPF 164 and storing the acquired amplitude in the RAM 182 and the like is repeated for a preset number of times while the register value in the register 183 is increased (or decreased) by 1 LSB each time the processing step is repeated. However, this is not a limit. For example, the processing step may be repeated until the register value for the amplitude thereof to be largest is found while the register value in the register 183 is increased (or decreased) by 1 LSB each time the processing step is repeated.

In the embodiment, the identified register value (the register value for the amplitude of the signal to be largest, the signal which passes through the BPF 164) is stored in the register 183, and when data is reproduced or recorded, the BPF 164 is adjusted based on the value obtained by adding 1 LSB to the identified register value stored in the register 183, but this is not a limit. For example, the value obtained by adding 1 LSB to the identified register value may be stored in the register 183 as a register value, and when data is reproduced or recorded, the BPF 164 may be adjusted based on the register value stored in the register 183.

In the modification, the identified register value is stored in the register 183, and the BPF 164 is adjusted based on the identified register value stored in the register 183 when data is reproduced, and also adjusted based on the value obtained by adding 1 LSB to the identified register value when data is recorded, but this is not a limit. For example, the value obtained by adding 1 LSB to the identified register value may be stored in the register 183 as a register value, and the BPF 164 may be adjusted based on a value obtained by adding −1 LSB to the register value stored in the register 183 when data is reproduced, and also adjusted based on the register value stored in the register 183 when data is recorded. For another example, the identified register value and the value obtained by adding 1 LSB to the identified register value may be stored in a first register and a second register as register values, respectively, and the BPF 164 may be adjusted based on the register value stored in the first resister when data is reproduced, and adjusted based on the register value stored in the second register when data is recorded.

According to a first aspect of the preferred embodiments of the present invention, there is provided an optical disk apparatus to record data on an optical disk on which a wobble is formed, the optical disk apparatus including; a detection unit including a band-pass filter through which a signal obtained from a reflected light from an optical disk passes, the detection unit to detect a wobble signal from a wobble based on the signal which passes through the band-pass filter; a register to store an adjustment value for adjusting the band-pass filter as a register value; an acquisition unit to adjust the band-pass filter based on each of register values obtained by changing the register value 1 LSB by 1 LSB, and acquire an amplitude of the signal which passes through the band-pass filter, the amplitude corresponding to each of the obtained register values; an identification unit to identify one of the register values for the amplitude acquired by the acquisition unit to be largest; and an adjustment unit to adjust the band-pass filter based on a value obtained by adding 1 LSB to the register value identified by the identification unit when data is recorded.

According to a second aspect of the preferred embodiments of the present invention, there is provided an optical disk apparatus to record data on and reproduce data from an optical disk on which a wobble is formed, the optical disk apparatus including; a detection unit including a band-pass filter through which a signal obtained from a reflected light from an optical disk passes, the detection unit to detect a wobble signal from a wobble based on the signal which passes through the band-pass filter; a register to store an adjustment value for adjusting the band-pass filter as a register value; an acquisition unit to adjust the band-pass filter based on each of register values obtained by changing the register value 1 LSB by 1 LSB, and acquire an amplitude of the signal which passes through the band-pass filter, the amplitude corresponding to each of the obtained register values; an identification unit to identify one of the register values for the amplitude acquired by the acquisition unit to be largest; and an adjustment unit to adjust the band-pass filter based on the register value identified by the identification unit when data is reproduced, and adjust the band-pass filter based on a value obtained by adding 1 LSB to the register value identified by the identification unit when data is recorded.

According to the embodiments of the present invention, a highest-quality wobble signal can be detected (extracted) without adding another element such as a jitter measurement circuit. Consequently, data can be recorded at higher quality without increasing a manufacturing cost and reducing its video quality and audio quality.

The entire disclosure of Japanese Patent Application No. 2009-140634 filed on Jun. 12, 2009 including description, claims, drawings, and abstract are incorporated herein by reference in its entirety.

Although various exemplary embodiments and modifications have been shown and described, the invention is not limited to the embodiments and modifications shown. Therefore, the scope of the invention is intended to be limited solely by the scope of the claims that follow.

What is claimed is:

1. An optical disk apparatus to record data on an optical disk on which a wobble is formed, the optical disk apparatus comprising:
    a detection unit including a band-pass filter through which a signal obtained from a reflected light from an optical disk passes, the detection unit to detect a wobble signal from a wobble based on the signal which passes through the band-pass filter;
    a register to store an adjustment value for adjusting the band-pass filter as a register value;
    an acquisition unit to adjust the band-pass filter based on each of register values obtained by changing the register value 1 LSB by 1 LSB, and acquire an amplitude of the signal which passes through the band-pass filter, the amplitude corresponding to each of the obtained register values;
    an identification unit to identify one of the register values for the amplitude acquired by the acquisition unit to be largest; and
    an adjustment unit to adjust the band-pass filter based on a value obtained by adding 1 LSB to the register value identified by the identification unit when data is recorded.

2. An optical disk apparatus to record data on and reproduce data from an optical disk on which a wobble is formed, the optical disk apparatus comprising:
    a detection unit including a band-pass filter through which a signal obtained from a reflected light from an optical disk passes, the detection unit to detect a wobble signal from a wobble based on the signal which passes through the band-pass filter;
    a register to store an adjustment value for adjusting the band-pass filter as a register value;
    an acquisition unit to adjust the band-pass filter based on each of register values obtained by changing the register value 1 LSB by 1 LSB, and acquire an amplitude of the signal which passes through the band-pass filter, the amplitude corresponding to each of the obtained register values;
    an identification unit to identify one of the register values for the amplitude acquired by the acquisition unit to be largest; and
    an adjustment unit to adjust the band-pass filter based on the register value identified by the identification unit when data is reproduced, and adjust the band-pass filter based on a value obtained by adding 1 LSB to the register value identified by the identification unit when data is recorded.

* * * * *